UNITED STATES PATENT OFFICE.

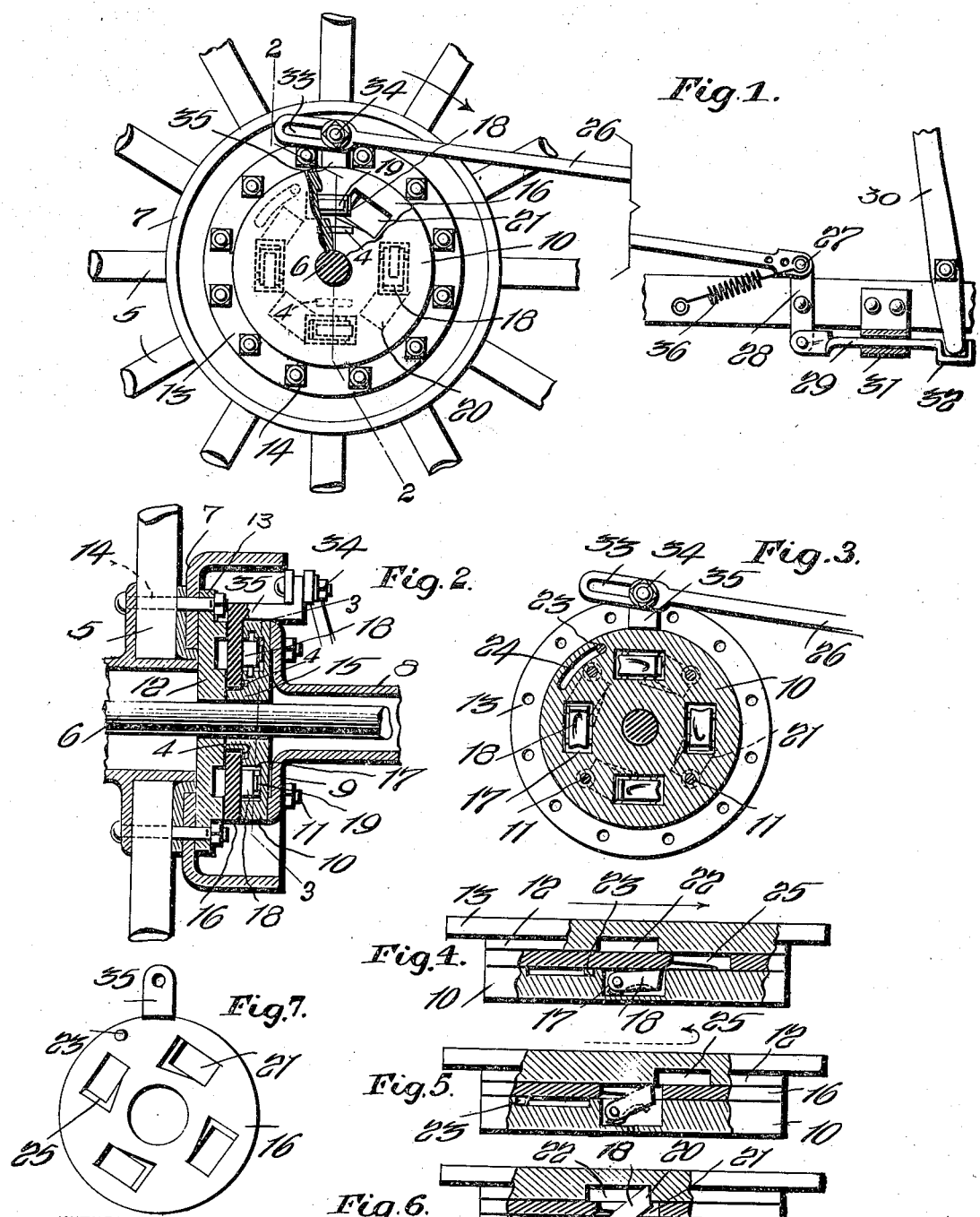

CHARLES PAUL CIRAC, OF STILLWATER, NEVADA.

SAFETY REVERSE-MOVEMENT LOCK FOR AUTOMOBILES.

1,237,169.   Specification of Letters Patent.   Patented Aug. 14, 1917.

Application filed March 16, 1917. Serial No. 155,208.

*To all whom it may concern:*

Be it known that I, CHARLES P. CIRAC, a citizen of the United States, and a resident of Stillwater, in the county of Churchill and State of Nevada, have invented a certain new and useful Improvement in Safety Reverse-Movement Locks for Automobiles, of which the following is a specification.

One of the principal objects of my invention is to provide an improved safety device for use particularly in connection with automobiles, for automatically operating to prevent accidental reverse movement of the machine, the apparatus being movable into position to allow reverse movement of the automobile, through the movement of the gear shift lever into "reverse" position.

While the invention is particularly useful in connection with automobiles, it will be understood that its use would be found to be of great advantage on all sorts of machinery and machines, such as hoisting engines, street cars, traction engines, etc.

A further object of the invention contemplates the provision of an improved device of the character described, which will be characterized by advantages of simplicity, durability, efficiency in operation, and economy in manufacture and maintenance.

With these and other objects in view which will become apparent as the description proceeds, the invention resides in the construction, combination, and arrangement of parts hereinafter more fully described and claimed, and illustrated in the accompanying drawing in which like characters of reference indicate like parts throughout the several figures, of which—

Figure 1 represents a view, taken transversely of the rear axle of an automobile adjacent one of the drive wheels, looking toward the drive wheel from the inside thereof, the view also showing the arrangement whereby the device is controlled by the gear shift lever of the automobile;

Fig. 2 represents a view in section taken transversely of the wheel, on the plane indicated by the line 2—2 of Fig. 1;

Fig. 3 represents a view in section taken on the plane indicated by the line 3—3 of Fig. 2;

Figs. 4, 5, and 6 represent horizontal sectional views taken through the device, showing the position of the parts at successive phases of operation;

Fig. 7 represents a plan view of the control plate detached.

Referring more particularly to the drawing, 5 indicates the wheel of the automobile, mounted for rotation on the axle 6, and at 7 is shown the brake drum secured for rotation with the wheel 5. The outer end of the axle housing 8 is formed with the usual flange 9, and between this flange and the wheel, and within the brake drum, is mounted the device which forms the subject of my invention. It will be understood that one of the safety locking devices is mounted in each of the brake drums. Since they are both constructed alike and operate in the same manner, a description of one of the locking devices will suffice for both.

It includes a circular base plate 10 surrounding the axle 6, and fixedly secured to the flange 9 by means of suitable fastenings 11. A circular locking plate 12 also surrounds the axle, and is equipped at its base with a marginal flange 13 which is secured to the brake drum for movement with the drum, through the medium of the same bolts or other fastenings 14, which secure the wheel spokes in place within the hub. Arranged between the base plate 10 and the locking plate 12 is a circular control plate rotatably mounted on a reduced portion 15 of the base plate 10. The control plate 16 is frictionally held in engagement with the locking plate 12, through the action of suitable leaf springs 4, or their equivalent, interposed between the control plate and the base plate 10. The control plate may, however, be forcibly moved relatively to the said locking plate.

At quadrantially arranged points the base plate 10 is provided on its inner face, with recesses 17 in which the locking dogs 18 are pivoted. These dogs are pivoted in the recesses at analogous ends, and are under the tension of springs 19 which operate to force the free ends 20 of the dogs, which are preferably beveled as shown, outwardly beyond the inner face of the base plate. The control plate 16 is provided with openings 21 extending therethrough, which openings correspond in position, number, and arrangement with the recesses 17 in the base plate. The locking plate also is provided on its inner face with recesses 22 into which the outer ends of the locking dogs 18 may project, as indicated in Fig. 6, when these recesses 22, openings 21, and recesses 17 are in registration. The control plate, at a point adjacent its periphery, is provided with a pin 23 which projects into an arcuate slot or groove 24, cut in the inner face of the base plate 10, and this pin and slot arrangement limits the oscillatory movement of the control plate 16 relatively to the plate 10.

The automatic operation of the device may be briefly described as follows: The automobile having come to a stop from a forward movement, the position of the parts of the device will be that indicated in Figs. 1 and 4. Now should the brakes accidentally become released, or should the machine start backwardly from any cause, the locking plate in turning rearwardly, will carry with it the control plate 16, by reason of the frictional engagement between these plates, and this movement will continue until the pin 23 on the control plate will have reached the rear terminal of the slot 24. At this point the openings 21 in the control plate 16 will have alined with the recesses 17 and the dogs 18 will have moved outwardly under the action of their springs into engagement with the inner surface of the locking plate 12. The parts will then be in the position indicated in Fig. 5. A further rearward rotation of the wheel carrying with it the locking plate 12, will bring the recesses 22 into alinement with the openings 21 in the locking plate, and will allow of the dogs 18 engaging in the recesses 22 and thus effectually arresting any further rearward rotation of the wheels. When the vehicle starts forwardly under the impulse of its motor, the control plate, through the action of its frictional engagement with the locking plate, will be moved forwardly until the pin 23 reaches the forward end of the slot 24. This action of the plate will serve to withdraw the dogs 18 from the recesses 22 in the locking plate, since the rear edges of the recessed portion 21 of the control plate, which are beveled as indicated at 25, will serve as wedges for moving the dogs 18 out of the recesses 22. When the pins 23 will have reached the forward end of slot 24, solid portions of the control plate will have moved over the recesses 17, and hence the dogs 18 will be retained within the recesses under the solid portions of the plate 16, and this will allow rotation of the locking plate as the vehicle travels forwardly, without a continual running over of the dogs 18. Hence, the device will be noiseless. The dogs will thus be held by the control plate within the recesses 17 until the control plate is again moved rearwardly to bring the opening 21 into alinement with the openings 17.

In order that the control plate may be operated from the driver's seat whereby to allow unrestricted rearward motion of the vehicle when the same is desired, I have provided an arrangement which operates automatically when the gear shift lever is thrown into the "reverse" position, to hold the control plate in such position that the locking dogs 18 will remain out of engagement with the locking plate. This mechanism includes a rod 26 pivotally and adjustably connected at its forward end as at 27, to one end of a centrally pivoted lever 28, mounted at a suitable point on the framework of the car. The opposite end of the lever 28 is connected by means of a link 29 with the lower end of the gear shift lever indicated generally at 30. The link 29 may be supported in a suitable guide 31, and at its forward end is provided with a cup or socket 32 into which the lower end of the gear shift lever projects.

The rear end of rod 26 is provided with a slot 33 through which a pin 34 carried by a suitable bracket 35 formed on or otherwise secured to the control plate 16, projects. Assuming that the gear shift lever is to be moved forwardly in assuming its selected reverse position, and it being desirable to reverse the direction of movement of the automobile, the control lever in being moved forwardly will cause the link 29 to move rearwardly, and this action, through the pivoted lever 28, will result in the rod 26 moving forwardly, so that the slot 33 will ride over the pin 34, the parts being in the position indicated in Fig. 1, until the pin is held at the rear end of the slot. The control plate will thus be held against rearward movement with the locking plate as the wheel starts to turn rearwardly, and hence the dogs will be retained within their recesses and out of engagement with the locking plate, so that unobstructed reverse movement of the vehicle may continue at the will of the operator.

Should it happen that the dogs 18 are in operative engagement with the recesses 22 in the locking plate, when it is desired to reverse the vehicle, it will follow that the pin 34 will be at the rear end of the slot 33, before the gear shift lever is moved into reverse position, and therefore when the lever is shifted, the rod 26 in moving forwardly will forcibly shift the control plate forwardly whereby to wedge the dogs 18 out of engagement with the locking plate and simultaneously move solid portions of the control plate over the recesses in the base plate for retaining the dogs in inoperative position. A spring 36 is connected to lever 28 or rod 26 for normally holding the rod in the position indicated in Fig. 1, in which position it will be apparent, no hindrance will be placed against the automatic movement of the control plate, it being understood that the slot 33 is of a length approximating the length of the slot 24 in the plate 10, so that the control plate may oscillate backwardly and forwardly with movements of the wheel by reason of its frictional engagement with the locking plate, as already set out.

It will be understood that each of the two locking devices is provided with one of the operating rods 26, and both rods at their forward ends are connected with the single lever 28, so that when the gear shift lever is moved into its reverse position, both of the locking devices will be thrown into operation simultaneously.

Although I have described the preferred embodiment of my invention, I may desire to make such changes in the construction, combination, and arrangement of parts thereof, as do not depart from the spirit of the invention and the scope of the appended claims.

I claim:

1. In a device of the class described, the combination with a drive wheel and a stationary axle casing, of a base plate fixed to the casing and having a plurality of laterally movable spring actuated dogs pivoted in recesses in the inner face of the base plate, a locking plate fixed for rotation with the wheel and having a plurality of recesses in its inner face for receiving the dogs when the latter are in operable position, a control plate mounted between the base plate and the locking plate for oscillation relatively to them, and having a plurality of openings adapted to be brought into registration with the recesses in the base plate and locking plate when in one position for allowing movement of the dogs into the recesses in the locking plate, and adapted to be moved out of registration with the recesses in the base plate when the control plate is moved in an opposite direction for moving the dogs out of the recesses in the locking plate, spring means between the base plate and control plate for effecting a frictional engagement of the control plate and locking plate, and coöperating means between the control plate and base plate for limiting the movement of the control plate in either direction relatively to the base plate.

2. In a device of the class described, the combination with a drive wheel, and a stationary axle casing, of a base plate fixed to the casing and having a plurality of laterally movable spring actuated dogs pivoted thereto, a locking plate fixed for rotation with the wheel and having a plurality of recesses for receiving the dogs when the latter are moved into operable position, a movable control plate interposed between the base plate and locking plate and having means for allowing movement of the dogs into operable position when the control plate is in one position, and for moving the dogs out of operable position when the control plate is in another position, means effecting a frictional engagement between the control plate and the locking plate for automatically moving the control plate into position for allowing movement of the dogs into engagement with the recesses in the locking plate when said locking plate moves in a reverse direction, and for automatically moving the control plate into position for moving the dogs into inoperable position when the locking plate moves in a forward direction, and means for limiting the movement of the control plate in either direction relatively to the base plate.

3. In a device of the class described, the combination with the drive wheel and a stationary axle casing, of a base plate fixed to the casing, and having a plurality of spring actuated dogs pivoted thereon, a locking plate fixed for rotation with the wheel, and adapted to be engaged by the dogs when the latter are released for locking the locking plate against reverse movement relatively to the base plate, a movable control plate interposed between the base plate and locking plate and movable into position for releasing the dogs and for disengaging them from the locking plate, means effecting a frictional engagement between the control plate and locking plate whereby the control plate will be moved into position for releasing the dogs when the locking plate moves in a reverse direction, and whereby the control plate will be moved into position for disengaging the dogs when the locking plate moves in a forward direction, and means for limiting the movement of the control plate in either direction.

4. In a device of the class described, the combination of a fixed plate, a movable plate, spring actuated dogs carried by one of the plates and engageable with the other when released for locking the movable plate against movement in one direction relatively to the fixed plate, and a control plate interposed between the fixed and movable plates and having means for releasing and disengaging the dogs when the control plate is moved in one direction and another, said control plate frictionally engaging the movable plate whereby to be moved into position for releasing the dogs when the control plate is moved in the said one direction, and whereby to be moved into position for disengaging the dogs when the control plate is moved in an opposite direction.

5. In a device of the class described, the combination of a fixed plate, a movable plate, movable relatively to the fixed plate, clutch means carried by one of the plates and engageable with the other for locking the movable plate against movement relatively to the fixed plate when the clutch means are released, a control plate movable into positions for releasing the clutch means and for disengaging them, and means effecting an automatic control of the control plate by the movable plate whereby the control plate will be moved into position for releasing the clutch means when the movable plate is moved in one direction, and whereby the control plate will be moved into a position for disengaging the clutch means when the movable plate is moved in an opposite direction.

6. In a device of the class described, the combination of a fixed plate, a movable plate, clutch means for locking the movable plate against movement in one direction relatively to the fixed plate when the clutch means are released, and means operable by the movable plate whereby to release the clutch means when the movable plate is moved in the one direction, and to disengage the clutch means when the movable plate is moved in the other direction.

7. In a device of the class described, the combination of a fixed plate, a movable plate, clutch means for locking the movable plate with the fixed plate against movement in one direction when the clutch means are released, a plate controlled by the movable plate and having means for releasing the clutch means when the movable plate is moved in the one direction, and for disengaging the clutch means when the movable plate is moved in an opposite direction, and manually actuable means for controlling the said movable plate controlled plate.

8. In a device of the class described, the combination with a drive wheel, and a stationary axle casing, of a base plate fixed to the casing, a locking plate fixed for rotation with the drive wheel, clutch means for locking the locking plate and base plate to prevent rotation of the locking plate in one direction when the clutch means is released, a movable control plate for releasing the clutch means when the control plate is moved into one position, and for disengaging the clutch means when the control plate is moved into another position, and means whereby the control plate may be manually moved into positions for releasing the clutch means and for disengaging the same.

CHARLES PAUL CIRAC.

Witnesses:
E. D. McCracken,
G. J. Kenny.